(12) United States Patent
Siegel et al.

(10) Patent No.: US 8,046,325 B2
(45) Date of Patent: Oct. 25, 2011

(54) METHOD AND SYSTEM FOR DISTRIBUTING PRODUCT INFORMATION

(75) Inventors: Brian M. Siegel, Washingtonville, NY (US); Gregory D. Gudorf, San Diego, CA (US)

(73) Assignees: Sony Electronics Inc., Park Ridge, NJ (US); Sony Corporation (JP)

( * ) Notice: Subject to any disclaimer, the term of this patent is extended or adjusted under 35 U.S.C. 154(b) by 396 days.

(21) Appl. No.: 12/316,867

(22) Filed: Dec. 17, 2008

(65) Prior Publication Data

US 2009/0106209 A1 Apr. 23, 2009

Related U.S. Application Data

(63) Continuation of application No. 09/805,534, filed on Mar. 13, 2001, now Pat. No. 7,472,104.

(51) Int. Cl.
*G06F 17/30* (2006.01)
(52) U.S. Cl. ........................................................ 707/607
(58) Field of Classification Search .................. 707/2, 9, 707/607; 705/34
See application file for complete search history.

(56) References Cited

U.S. PATENT DOCUMENTS

| | | | |
|---|---|---|---|
| 5,361,871 A | 11/1994 | Gupta | |
| 5,913,210 A | 6/1999 | Call | |
| 6,029,145 A * | 2/2000 | Barritz et al. | 705/34 |
| 6,154,738 A | 11/2000 | Call | |
| 6,185,601 B1 | 2/2001 | Wolff | |
| 6,243,717 B1 | 6/2001 | Gordon | |
| 6,763,384 B1 | 7/2004 | Gupta et al. | |
| 2002/0083057 A1 * | 6/2002 | Zulpa et al. | 707/9 |
| 2002/0103734 A1 * | 8/2002 | Glassco et al. | 705/35 |

OTHER PUBLICATIONS

Cade Metz, Syndication/Affiliate Networks: Leverage Your Web Presence, www.zdnet.com (dated Jun. 26, 2000; printed Mar. 12, 2001).

Sheryl Canter, Using Sydicated Content, www.zdnet.com (dated Jul. 17, 2000; printed Mar. 12, 2000).

Arthur M. Keller, et al, A Smart Catalog and Brokering Architecture For Electronic Commerce, http://www.db.stanford.edu/pub/keller/1994/cnet-cat-arch.pdf, 3 pages (dated Dec. 1994).

William T. Wong & Arthur M. Keller, Developing an Internet Presence with On-line Electronic Catalogs, ###http://www.db.stanford.edu/pub/keller/1994/cnet-cat-arch.pdf, 4 pages (dated Oct. 9, 1994).

* cited by examiner

*Primary Examiner* — Etienne Leroux
(74) *Attorney, Agent, or Firm* — Lerner, David, Littenberg, Krumholz & Mentlik, LLP (57) ABSTRACT

A method and system of associating product codes with product characteristics, and using those product codes to send and receive information about those characteristics to destinations on a network when the values of those characteristics change.

12 Claims, 4 Drawing Sheets

Dealer Table
310

| Dealer ID | Dealer Address |
|---|---|
| Dealer A | DealerCompanyA.com/ResponseInfo |
| Dealer B | CompanyDealerB.com/gather |

↑ 311    ↑ 312

Dealer-Product Authorization Table
330

| PIIC | Dealer ID | Updates |
|---|---|---|
| R100-picture | Dealer A | False |
| R100-specifications | Dealer A | True |
| R100-picture | Dealer B | False |
| R100-specifications | Dealer B | True |
| R100-wholesaleprice | Dealer B | True |

↑ 331    ↑ 332    ↑ 333

Product Table
320

| PIIC | Content Item |
|---|---|
| R100-picture | <center><IMG SRC="Radio.bmp"></center><P> </P> |
| R100-wholesaleprice | <P>$45</P> |
| R100-specifications | <P>class: radio </P><P>name: PowerRadio</P><P>stereo: Yes</P><P>power: AC; 4 C Batteries</P><P>tuning: Manual</P><P>size: 6" x 7" x 3"</P><P>weight: 3 lbs</P><P>colors: black, silver, red</P><P>other: water resistant</P> |

FIGURE 4

# METHOD AND SYSTEM FOR DISTRIBUTING PRODUCT INFORMATION

CROSS-REFERENCE TO RELATED APPLICATIONS

This application is a continuation of U.S. application Ser. No. 09/805,534, filed on Mar. 13, 2001, the disclosure of which is incorporated herein by reference.

BACKGROUND OF THE INVENTION

A manufacturer and dealer of the manufacturer's goods typically work together to ensure that the dealer has correct information about the manufacturer's products. For example, when a product is updated or changed, the manufacturer often sends the product information to the dealer. This information is frequently sent in hard copy form, with a piece of paper containing either a list of the product modifications or an entirely new product specification sheet. In response, the dealer will typically add the new information into the dealer's own advertising literature.

The foregoing process is fraught with inefficiency and potential for errors. It is inefficient because personnel must first transcribe the new product information and then integrate it into the dealer's advertising literature. During the transcription process, typographical errors may creep into the dealer's advertising literature.

Although product information may be sent in electronic form by disk or email to facilitate the dealer's use of the information, that alone is not enough to cure the inefficiencies associated with the foregoing process. While it may eliminate the need to transcribe the information, it does not eliminate the time and expense of integrating the information into the dealer's product literature. The inefficiency is compounded by the fact that many dealers are all go through the same process of modifying their product literature.

In addition, once the product information is electronically received by the dealers, there is no way for the manufacturer to track whether the information was used, and if so how often it was used and whether it was used correctly. Without such tracking data, manufacturers are limited in their ability to provide accurate and efficient product information or updates to that information.

SUMMARY OF THE INVENTION

The present invention addresses these needs.

In one aspect, the present invention provides a method of providing product information that includes associating a first code with a first characteristic of a product and a second code with a second characteristic of the same product, storing a first characteristic value associated with the first characteristic and a second characteristic value associated with the second characteristic, associating the identity of a first entity with at least one of the codes, changing at least one of the characteristic values, retrieving the identity of the first entity based on the association with the code associated with the characteristic with the changed value, and sending the changed value to the first entity.

In another aspect, a computer-implemented method of providing information about a product includes providing product data associating information codes to information about a product, providing destination data correlating the information codes to entities, modifying the information about the product, identifying a first entity based upon the information code associated with the information about a product, the product data and the destination data, and transmitting the modified information about a product or service to the first entity.

A system is provided in a further aspect of the invention, and it includes a server in communication with a destination computer via a network, data accessible by the server, the data including (a) a plurality of product codes, each code being associated with the characteristic of a product, (b) values representative of the characteristic, (c) the address of the destination computer, (c) data associating one or more the product codes with the address of the destination computer, and a processor for executing instructions, the instructions including sending a communication to the address when the value of a characteristic is changed and the product code associated with the characteristic is also associated with the address.

Another system in accordance with the invention provides means for associating a first code with a first characteristic of a product and a second code with a second characteristic of the same product, means for storing a first characteristic value associated with the first characteristic and a second characteristic value associated with the second characteristic, means for associating the identity of a first entity with at least one of the codes, means for changing at least one of the characteristic values, means for retrieving the identity of the first vendor based on the association with the code associated with the characteristic with the changed value, and means for sending the changed value to the first entity.

Yet another system provides a processor, data and instructions executable by the processor, such that the instructions include: associating a first code with a first characteristic of a product and a second code with a second characteristic of the same product; storing a first characteristic value associated with the first characteristic and a second characteristic value associated with the second characteristic; associating the identity of a first entity with at least one of the codes; changing at least one of the characteristic values; retrieving the identity of the first entity based on the association with the code associated with the characteristic with the changed value; sending the changed value to the first entity.

DETAILED DESCRIPTION OF THE PREFERRED EMBODIMENTS

Figure 1:
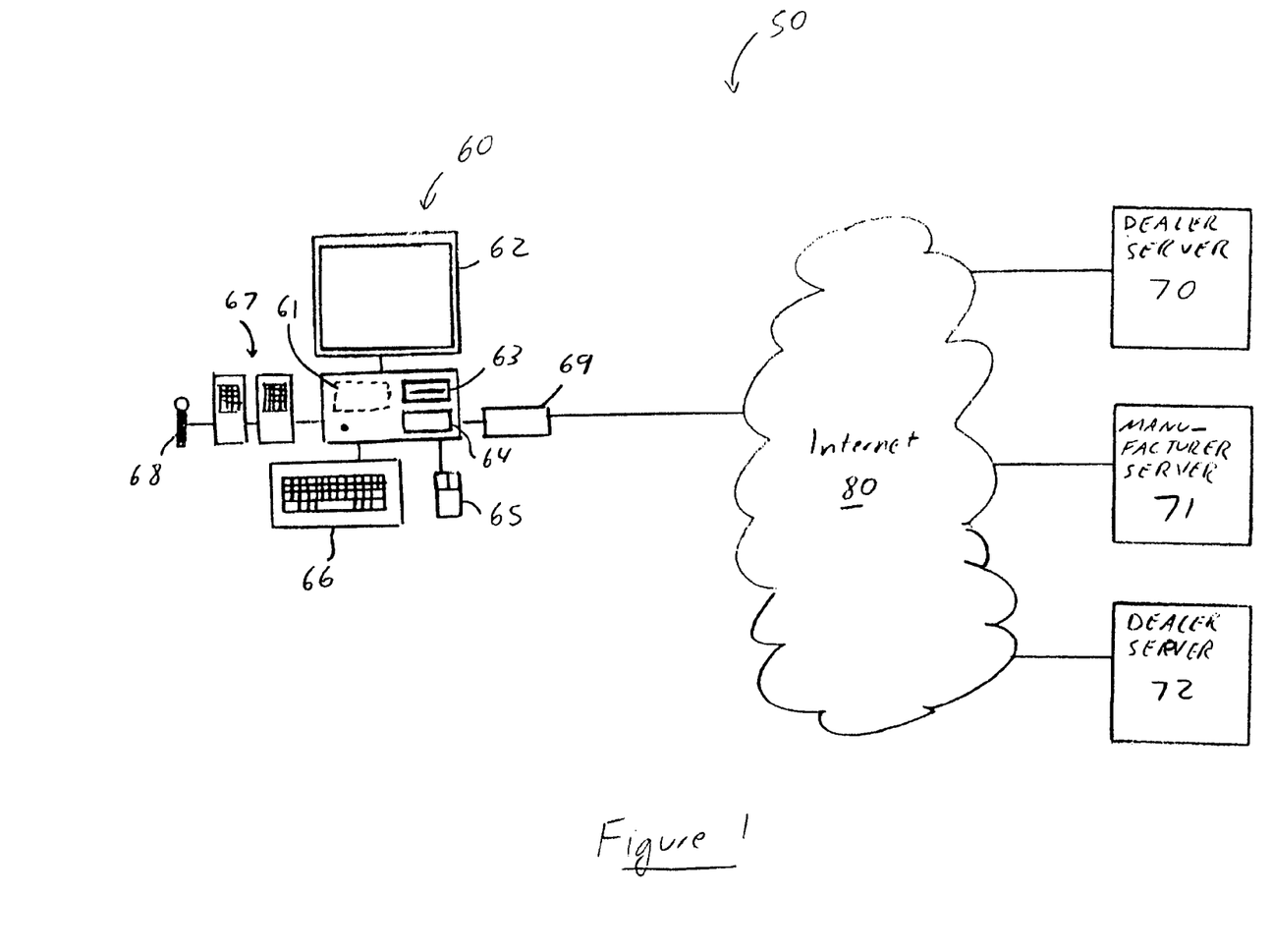
FIG. 1 is a functional diagram of a system in accordance with an embodiment of the present invention.

As shown in FIG. 1, a system 50 in accordance with one embodiment of the invention comprises a network of computers such as end user personal computer 60 which communicates with web servers 70-72 via Internet 80. Although only a few computers are depicted in FIG. 1, it should be appreciated that a typical system can include a large number of connected computers. Preferably, end user computer 60 is a general purpose computer having all the internal components normally found in a personal computer such as, for example, central processing unit (CPU) 61, display 62, CD-ROM 63, hard-drive 64, mouse 65, keyboard 66, speakers 67, microphone 68, modem 69 and all of the components used for connecting these elements to one another. End user computer 60 communicates with the Internet 60 via modem 69. End user computer 60 may comprise any work station or system capable of processing instructions and transmitting data to and from humans and other computers, including PDA's with modems, Internet-capable wireless phones and Internet user terminals. Although, CPU 61 is shown as a single processor, the instructions may actually be distributed to a number of different components or processors for execution.

Web servers 70-72, including dealer servers 70, 72 and manufacturer server 71, contain hardware for sending and receiving information over the World Wide Web, such as web pages or files. The web servers 70-72 may be typical web servers or any computer network server or other automated system capable of communicating with other computers over a network, including the Internet, wide area networks or local area networks. For example, the system described above in connection with end user computer 60 may also function as a web server.

Figure 2:
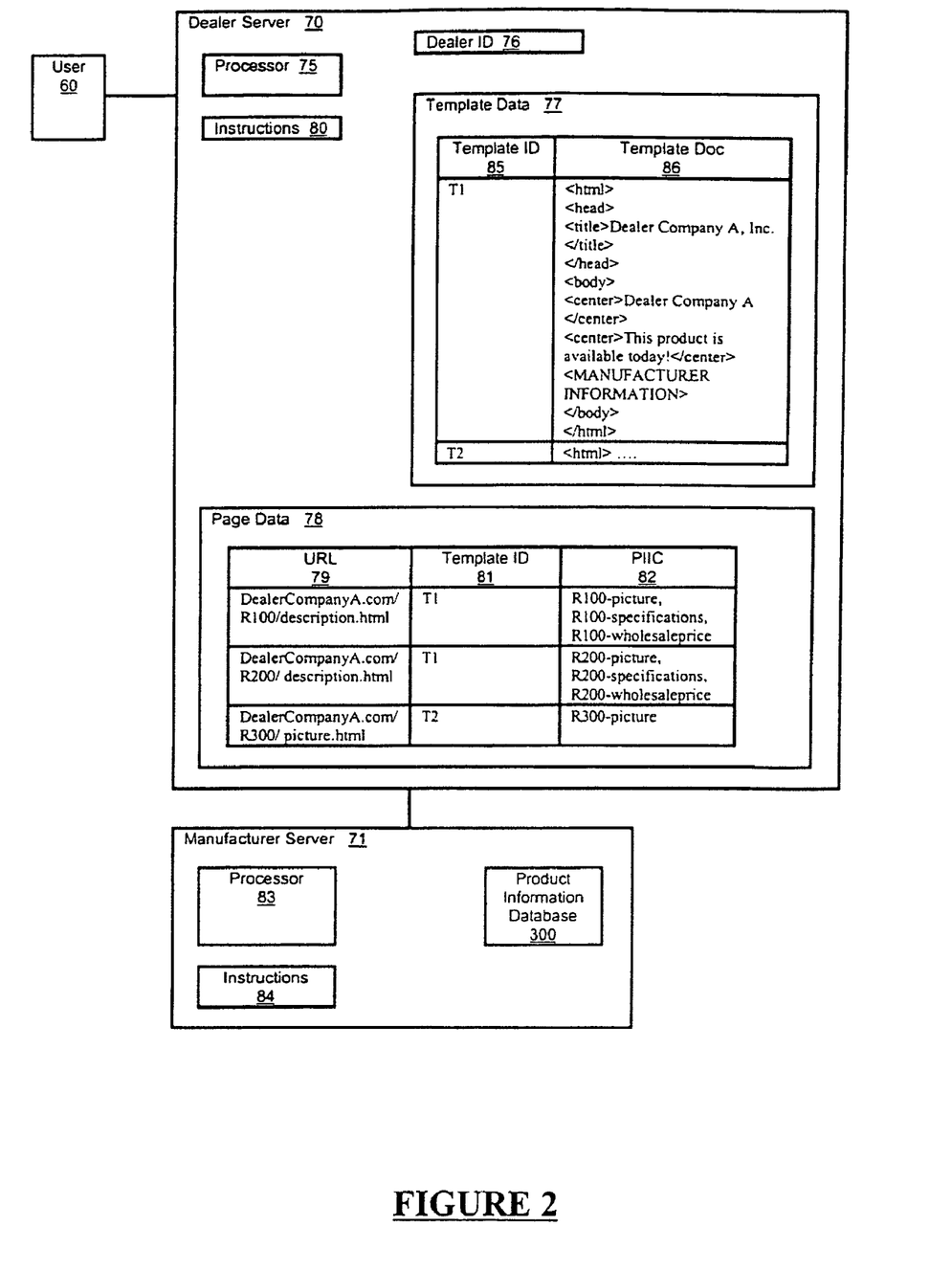
FIG. 2 is a functional diagram of a system, including data structures and exemplary data of a dealer server and manufacturer server, in accordance with an embodiment of the present invention.

As shown in greater detail in FIG. 2, dealer server 70 contains a processor 75, a set of instructions 80 which are executed by processor 80 and a variety of data. Preferably, the instructions 80 are stored as a program on the hard drive of the dealer server 70. The functions, methods and routines of the program are explained in more detail below. The data includes Dealer ID 76, Templates 77 and Page Data 78 and, although the data is shown separately from instructions 80, the data may be modified by the program.

Dealer ID 76 contains data uniquely identifying a particular collection of data stored in dealer server 70. For example, Dealer ID 76 may equal the string "Dealer A" if the server is being used to manage information relating to the company known as "Dealer Company A, Inc." If the same server is used to store data from multiple companies, there may be more than one Dealer ID stored in the server (and correspondingly more than one set of Templates 77 and Page Data 78). Moreover, even though the data may be maintained, i.e., its value determined by, one entity, the server itself may be operated by a different entity such as an ISP.

Page Data 78 contains, or points to, information to be displayed on a web page. Specifically, Page Data 78 may take the form of a database containing records having three fields, URL 79, Template ID 81 and PIIC 82. URL field 79 corresponds with the particular web page. The Template ID field 81 contains values which equal, or point to, one of the values contained in the Template ID field 85 of Template Data 77. The PIIC field 82 contains a list of the PIIC's associated with the web page. PIIC's are product information and identity codes that refer, to a particular item of information about a product or service as explained in more detail below.

Figure 4:
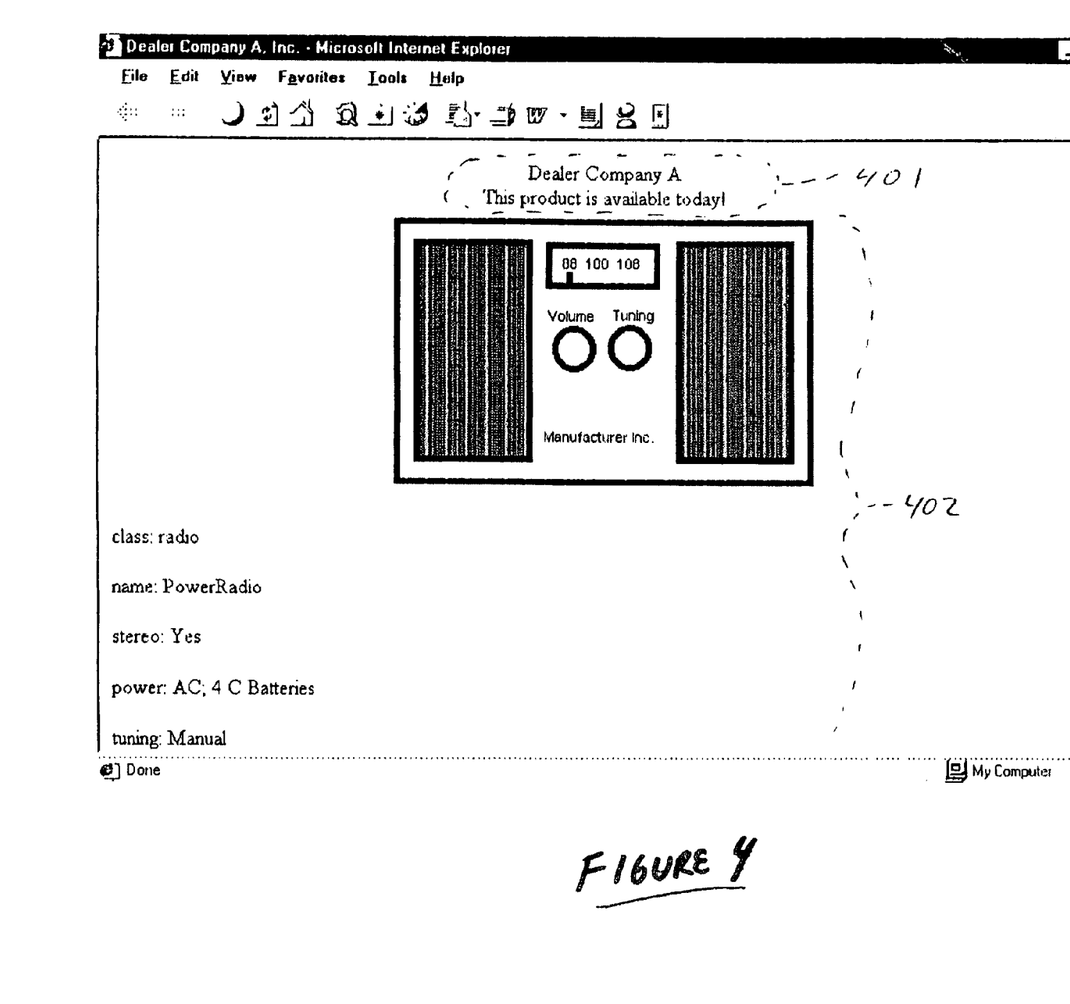
FIG. 4 is an exemplary web page created in accordance with an embodiment of the present invention.

Template Data 77 contains data describing how a particular web page looks. For example, an on-line catalog may have a different web page for every product, such that the pictures of the products and their descriptions change from page to page. However, in order to preserve consistency within a web site, it is preferable that the different web pages have a consistent look. Thus, many of the pages may display the same information or some types of information in the same general location. For example, FIG. 4 shows a web page advertising a radio. Just like the web page shown in FIG. 4, a web page on a CD player would preferably have the dealer's name centered in text at the top of the page, followed by a picture of the CD player immediately below, followed by a description of the CD player in left-justified text.

Each template in Template Data 77 has both a Template ID 85 which identifies the template (such as "T1" or "T2") and a Template Document 86 containing the information to be displayed on a web page other than the information specific to the product. A Template Document for the web page shown in FIG. 4 may accordingly take the following form:

```
<html>
<head>
<title>Dealer Company A, Inc.</title>
</head>
<body>
<center>Dealer Company A</center>
<center>This product is available today!</center>
<MANUFACTURER INFORMATION>
</body>
</html>
```

The string "<MANUFACTURER INFORMATION>" corresponds with the information that changes based on the product being displayed.

Dealer server 72, if operated by a separate company, would have its own set of data including its own Dealer ID such as "Dealer B Corporation." The PIIC's stored in dealer server 72 may overlap with the PIIC's stored in dealer server 70.

Manufacturer server 71 includes a processor 83, a set of instructions 84 which are executed by processor 83 and a Product Information Database 300. As with the instructions 80 of dealer server 70, instructions 84 are preferably stored as a program on the hard drive of the manufacturer server 71. The functions, methods and routines of the instruction 84 are explained in more detail below.

Figure 3:
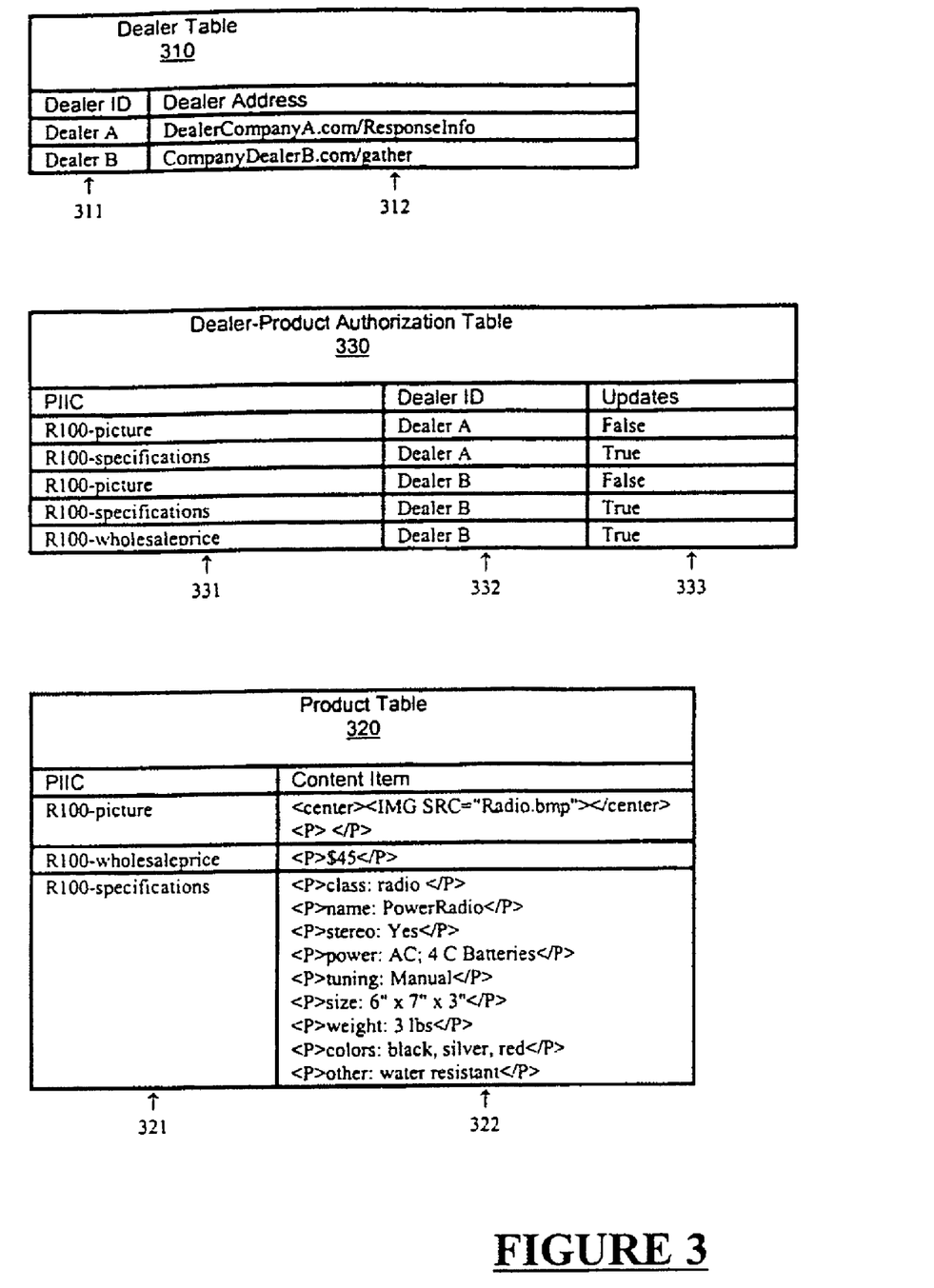
FIG. 3 is a functional diagram of the data structures and exemplary data of a Product Information Database in accordance with an embodiment of the present invention.

FIG. 3 illustrates the Product Information Database 300 in more detail. The Product Information Database 300 has three tables, including Dealer Table 310, Product Table 320 and Dealer-Product Authorization Table 330. These tables represent just one way that PIIC's may be associated with product characteristics and destinations. Dealer Table 310 contains a list of records having two fields, Dealer ID 311 and Dealer Address 312. The values contained in Dealer ID field 311 correspond with the Dealer ID 76 values of the various dealer servers, such as Dealer Server 70. The Dealer Address field 312 contains the electronic address of the respective dealer and, more particularly, states where product information is to be sent to the dealer. In a typical circumstance, that address is an IP Address such as a URL that points to Dealer Server 70. By way of example, the record corresponding with Dealer Company A, Inc. would have Dealer ID and Dealer Address values of "Dealer A" and "DealerCompanyA.com/ResponseInfo", respectively.

Product Table 320 contains records describing the characteristics of a product. Each individual item of product information has a Product Information and Identification Code (PIIC) 321 assigned to it. For example, one item of information may be how the product looks. For each PIIC, there is also a Content Item 322 associated with it. Thus, a picture of a radio may be stored in Product Table 320 by placing a record in the table whereby the PIIC 321 is "R100-picture" and the Content Item 322 is a bit-mapped file containing a picture of the unit. The radio's specifications may be stored in Product Table 320 as a record whereby PIIC 321 is "R100-specifications" and the Content Item 322 is a text document listing the specifications. Preferably, for the reasons explained below, the data is stored in HTML format.

Not every dealer will need, or be authorized to, access every feature of every product stored in Product Table 320.

For example, some dealers may not sell certain products and, therefore, do not need to obtain information about that product. Similarly, a dealer may not need to obtain all of the product information stored in Product Table 320 even if the dealer sells that product. For example, some dealers may not sell the product directly, but rather, simply advertise the product to the public on behalf of others. Such dealers would not need to know the wholesale price of the product. Also, a manufacturer may have a two-tiered pricing approach to its products whereby dealers in one group pay a different price then dealers in another group. The manufacturer may store both prices in Product Table 320, with separate PIIC's, but may want to prevent dealers from the first group from learning the prices intended for dealers in the other group, and vice versa.

Dealer-Product Authorization Table 330 contains values indicating whether or not a particular dealer is entitled to obtain a particular item of product information. If a dealer is authorized to obtain a particular item of information about a product, then Dealer-Product Authorization Table 330 will contain a record specifying the dealer's Dealer ID and the item's PIIC. Otherwise, if there is no such authorization, then there will be no such record.

The data structures described herein, such as Page Data 78 and Product Information Database 300, are exemplary only. Other data structures, such as different fields and tables or completely different methods of storing information such as XML or the like, may also be used instead.

In one possible operation of the present invention, user 60 requests a web page by transmitting a request for product information to dealer server 70 via Internet 80. Such a request may take the form of a URL, which URL may have been provided by the user clicking on a hot-link that caused the user to jump to a page containing a picture and description of a product. For illustration purposes, the user shall be assumed to be interested in information about a radio offered by the manufacturer maintaining the information contained in manufacturer server 71. The exemplary radio shall be hereafter referred to as the "R100 Radio" and the URL of the web page shall be considered to be "DealerCompanyA.com/R100/description.html".

Upon receipt of the URL and in accordance with instructions 80, processor 75 in dealer server 70 searches Page Data 78 for a record associated with the URL. Once a match is found, the processor extracts the PIIC's 82 from the record. For example, the PIIC's 82 associated with the foregoing URL may include the strings "R100-picture", "R100-specifications" and "R100-wholesaleprice" if the web page is intended to show the user 60 a picture, description and wholesale price of the R100 Radio.

Dealer server 70 transmits its Dealer ID 76 and the PIIC's 82 from Page Data 78 to manufacturer server 71 via Internet 80. Based on the Dealer ID and in accordance with instructions 84, processor 83 of manufacturer server 71 queries the Dealer-Product Authorization Table 330 to obtain a list of those PIIC's that the particular dealer both requested and is authorized to receive. Using the foregoing example, dealer server 75 will send the message "Dealer A; R100-picture, R100-specifications, R100-wholesaleprice" to manufacturer server 71 when user 60 requests information associated with the aforementioned URL. In response, the manufacture server 71 queries the Dealer-Product Authorization Table 330 to get a list of all records which contain "Dealer A" in the Dealer ID field 332 and any one of the requested PIIC's in the PIIC field 331. In this example, there is a record containing "Dealer A" and "R100-picture" and a record containing "Dealer A" and "R100-specifications" but no record containing "Dealer A" and "R100-wholesaleprice." Thus, the list of requested and authorized PIIC's is limited to "R100-picture" and "R100-specifications". Optionally, for increased security, dealer server 70 may have also transmitted a password to verify the authenticity of the request.

Although the dealer in the example is not informed that it was not entitled to wholesale price of the product, the dealer may check to see whether it received all of the product information that it requested. Alternatively, the manufacturer may send an error message whenever unauthorized PIIC's are requested.

Based on the list of requested and authorized PIIC's, manufacturer server 71 queries Product Table 320 to obtain a list of records containing the actual product information. Processor 83 pulls those records from the Product Table and extracts the information associated with the individual PIIC's, such as text, pictures or any other information stored in Content Item field 322. Using the foregoing example again, the processor will pull a bit-mapped picture of the R100 radio and a textual description of its features.

Based on the pulled content, processor 83 then creates a portion of a web page that contains the requested product information. The web page portion is a HTML-compliant document that contains both the requested information and instructions on how to display the information on the web page. By way of the foregoing example, in response to the request from Dealer Company A for a picture and specifications regarding the R100 Radio, manufacturer server creates a portion of a web page that contains both the picture and text and directs their placement on the page. For ease of reference, this information shall be referred to as the Authorized Product Data. Thus, processor 83 creates the Authorized Product Data for the R100 Radio by concatenating the data contained in the Content Item field 322 of the applicable records:

```
<center><IMG SRC="Radio.bmp"></center>
<P> </P>
<P>class: radio </P>
<P>name: PowerRadio</P>
<P>stereo: Yes</P>
<P>power: AC; 4 C Batteries</P>
<P>tuning: Manual</P>
<P>size: 6" x 7" x 3"</P>
<P>weight: 3 lbs</P>
<P>colors: black, silver, red</P>
<P>other: water resistant</P>
```

The Authorized Product Data containing the product information is then sent from manufacturer server 71 back to the dealer server 75 using the pre-stored address of the dealer. Specifically, processor 83 uses the supplied Dealer ID to query Dealer Table 310 and obtain the electronic address of the dealer from Dealer Address field 312. The dealer's request is appended to the beginning of the HTML document (so the dealer can match the response to the original request) and the entire document is then sent to the dealer. Using the above example, the foregoing HTML document with the appended information would be sent to "DealerCompanyA.com/ResponseInfo", i.e., address designated by Dealer Company A for receiving information from manufacturer server 71.

Once the requested information is received at the dealer's designated address, dealer server 70 matches the response to the request and inserts the HTML-document into a web page to be sent to the user. First, processor 84 of dealer server 70 checks the beginning of the information to match it to the pending request and then removes that portion from the Authorized Product Data. Second, the program retrieves the Template ID 81 from Page Data 78 and uses that Template ID to retrieve the corresponding Template Document 86 from Template Data 77. The portion of the Template Document 86 that corresponds with information retrieved from the manufacturer is then deleted and replaced with the HTML document sent from manufacturer server 71. This modified document, which now includes information that was stored at both the dealer server and the manufacturer server, is then sent to the user 60 via the Internet 80.

By way of the continuing example, the foregoing HTML string would replace the "<MANUFACTURER INFORMATION>" portion of the Template Document so that user 60 would receive the following HTML document:

```
<html>
<head>
<title>Dealer Company A, Inc.</title>
</head>
<body>
<center>Dealer Company A</center>
<center>This   product   is   available
today!</center>
<center><IMG SRC="Radio.bmp"></center>
<P> </P>
<P>class: radio </P>
<P>name: PowerRadio</P>
<P>stereo: Yes</P>
<P>power: AC; 4 C Batteries</P>
<P>tuning: Manual</P>
<P>size: 6" x 7" x 3"</P>
<P>weight: 3 lbs</P>
<P>colors: black, silver, red</P>
<P>other: water resistant</P>
</body>
</html>
```

FIG. 4 illustrates what such a page may look like. Portion 401 relates to information kept at the dealer server 75 and portion 402 relates to information kept at manufacturer server 71.

In another embodiment, the requested information is not preformatted in HTML. Rather, the dealer is provided with the choice of how, if at all, to use and display the information. Preferably, such data is sent in accordance with the requirements of Extensible Markup Language (XML) or some similar syntax. An advantage of using XML is that the syntax of the system can be updated merely by periodically sending XML templates to the entities that use the information. For instance, the Authorized Patent Data may be sent in XML format as follows:

```
<R100-picture>
Radio.bmp
</R100-picture>
<R100-specifications>
class: radio
name: PowerRadio
stereo: Yes
power: AC; 4 C Batteries
tuning: Manual
size: 6" x 7" x 3"
weight: 3 lbs
colors: black, silver, red
other: water resistant
</R100-specifications>
```

Each individual item of product information is placed between tags corresponding with the PIIC of the information. Using an XML reader, the dealer server extracts the information and places it in the appropriate template document in the appropriate spot. For example, instead of having a single area in the template document identified as "<MANUFACTURER INFORMATION>", there may be two separate areas for substitution such as "<MANUFACTURER INFORMATION PIIC=R100-picture>" and "<MANUFACTURER INFORMATION PIIC=R100-specifications>".

The operation would be substantially identical when a user requests similar information from dealer server 72, except that the dealer would convert the data from XML to HTML.

In yet another embodiment, whenever product information is updated (such as by a user at a terminal with access to the data or by a computer in response to an event), that updated information is sent to those dealers that are authorized to receive such information. Specifically, product information which is provided to dealers is stored in Product Table 320 such that every item of information is associated with a particular PIIC. Moreover, the Dealer-Product Authorization Table 330 preferably includes an Updates field 333, which contains a Boolean value stating whether or not the dealer is automatically informed of updates to the item of information.

Whenever the content in Product Table 320 is modified (e.g., supplemented, deleted, changed, etc.), processor 83 of manufacturer server 71 creates an XML document such that the document's tags relate to the PIIC and the value between the tags relates to the modified information. The processor then queries Dealer-Product Authorization Table 330 for all records whereby the value in the PIIC Field 331 matches the value contained in the PIIC Field 321 of the modified product information in Product Table 320, and whereby the value of the Updates field is True. Based on the Dealer ID's contained in this list of records, the Dealer Addresses 312 are extracted from Dealer Table 310. The XML document containing the updates is then electronically distributed, such as by email, to all of the addresses in the list. Thus the Dealer Addresses 312 also function as a list of destinations for updated product information. The dealer can then use this information as it deems fit, including distributing it to other marketing representatives. For example, if the picture of the R100 Radio were updated, the following XML document would be sent to every dealer authorized to access, and automatically get updates to, a picture of the product: "<R100-picture>Radio2.bmp</R100-picture>". Because updates can include additions, modifications and deletions, the invention provides a powerful tool for getting new product information to those interested in it.

The present invention provides numerous advantages. First, it maximizes efficiency because a single change to a product description by the manufacturer will be immediately available any time a dealer needs to obtain the information for themselves or pass it along to a consumer. Indeed, it fosters accuracy because there is no need to transcribe the new product information. It further promotes the efficient use of storage space, because all of the product information is centrally located rather than being redundantly stored on dealer's servers. Thus, as shown in FIG. 1, a single manufacturer server 71 can provide the same data to multiple dealer servers 70, 72.

Moreover, the manufacturer can not only insure that its dealers are distributing up-to-date and accurate information, but also track who is distributing it and how often. This information can be helpful to the manufacturer. For example, the manufacturer may learn that one dealer's customers do more investigation before buying a product than another dealer. With this information, the manufacturer may tailor its marketing to that dealer's customers, such as adding comparative advertising.

Preferably, the dealer will send the manufacturer marketing information about the users that requested the product information. An advantage of the present invention is that the PIIC provides a convenient mechanism for this exchange of information. The dealer server 75 keeps a list of the users that accessed the information and periodically sends, broken down by PIIC, information about the users. Alternatively, the dealer server 75 may automatically send the user's internet address when it requests the information associated with the PIIC's.

Thus, the PIIC may also be used as a metric for tracking how the information associated with the PIIC is used, accessed, frequented or the like. Desirably, this information would include whether or not the user purchased the product after viewing the product specifications. This sort of information would be very helpful in determining how effective the individual PIIC items are at encouraging product sales.

In addition, if the manufacturer has information about the user, such as the user's demographic or prior purchase information, that information may be used to customize the Authorized Product Data.

An additional advantage is the fact that the manufacturer can send the product information to an address different from the address of the requester. For example, because some PIIC's may relate to very sensitive information, the product information is only sent to addresses contained in Dealer Address field 312 regardless of where the request came from. Alternatively, the databases may be modified so a dealer may specify different addresses for different PIIC's, or multiple addresses for the same PIIC. Yet further, some PIIC's may be tagged as being freely distributable to any requester.

Still another advantage is the fact that the entire process is seamless to the end user. All of the foregoing advantages occur without the knowledge of the user, thus preserving the relationship often developed between a user and particular dealer. At the same time, if the user is simply looking for the best deal for a particular product offered by a particular manufacturer, then the manufacturer can insure that the user is getting consistent information about its products regardless of the dealer.

Another advantage of the present invention is its flexibility. The foregoing embodiments are merely illustrative of one manner in which the invention may be implemented.

By using HTML, the advantage of the present invention is that the manufacturer has the ability to control how its product are displayed and perceived. For example, many manufacturers have branding requirements, whereby the manufacturer's trademark must be displayed in a certain format and distance from other items of information. By providing HTML documents in response to dealer requests, the manufacturer has a greater degree of control over such issues.

However, the granularity of the information can be readily changed. Rather than sending all of the product information together in one large string, the information may also be broken down into more discrete pieces of an XML document such as:

```
<class>radio</class>
<name>PowerRadio</name>
<stereo>Yes</stereo>
<power>AC; 4 C Batteries</power>
<tuning>Manual</tuning>
<height>6"</height>
<width>7"</width>
<depth>3"</depth>
<weight>3 lbs</weight>
<colors>black, silver, red
<other>water resistant</other>
```

One advantage of increasing the level of detail associated with PIIC's is that the automatic notification process immediately draws the dealer's attention to the relevant change during the automatic notification process. Another advantage is that it provides more information when tracking sales.

At the other end of the spectrum, providing an HTML document gives the manufacturer more control and the dealer may easily implement the invention by providing a frame in a browser for displaying the HTML document rather than using a Template Document.

Thus, the present invention allows a wide spectrum of control over how the information may be displayed. On the one hand, the manufacturer may control what information is displayed and how it looks by sending the information in an HTML-document, complete with formatting, with the intention that the document be displayed in a frame. On the other hand, the manufacturer may choose to allow the dealer to decide how to display the information by sending an XML document.

Moreover, although the present invention is particularly advantageous for use by entities in a provider/distributor relationship such as dealers and manufacturers, it may be used in other sorts of business, legal and technical relationships. Similarly, although the embodiments have primarily addressed information about products, the invention has equal applicability to services.

Unless stated to the contrary, any use of the words such as "including," "containing," "comprising" and the like, means "including without limitation" and shall not be construed to limit any general statement that it follows to the specific or similar items or matters immediately following it. Any use of the world "plurality" means at least two of the referenced thing. All company and product names, as well as URL addresses, are intended to be fictitious and used herein for purposes of example only. Any relationship to any existing company name, product name or URL (past or future) is coincidental and not intended.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

What is claimed is:

1. A method of using a processor to provide product information, comprising:

storing a first characteristic value and a second characteristic value associated with respective characteristics of a product, setting one or more distinct update values indicating whether an entity is authorized to receive changes relating to the first or second characteristic values, changing at least one of the characteristic values to produce a changed characteristic value, retrieving the identity of the entity based on the changed characteristic value, determining whether the entity is authorized to be sent the changed characteristic value based on one of the one or more distinct update values, and sending the changed characteristic value to the entity based on the determination, wherein each of the characteristic values is associated with a code, for each characteristic value that the entity is authorized to receive the code associated with the characteristic value is associated with an entity ID and an update value indicating whether the entity is authorized to receive changes relating to the code, retrieving the identity of the entity comprises retrieving the entity ID associated with the code corresponding to characteristic value that has changed, and determining whether the entity is authorized comprises determining the update value that is associated with both the code of the characteristic value that has changed and the entity ID.

2. The method of claim 1, further including retrieving the identity of a second entity based on the changed value and another of the one or more update values, and sending the changed value to the second entity.

3. The method of claim 1, wherein sending the changed characteristic value comprises sending the changed characteristic value by email.

4. The method of claim 3, wherein retrieving the identity of the entity includes retrieving an electronic address of the entity.

5. The method of claim 1, wherein the distinct update values comprise a Boolean value indicating whether the entity is automatically authorized to receive changes relating to the first or second characteristic values.

6. A system of providing product information comprising:
means for storing a first characteristic value and a second characteristic value associated with respective characteristics of a product,
means for setting one or more distinct update values indicating whether an entity is authorized to receive changes relating to the first or second characteristic values,
means for changing at least one of the characteristic values to produce a changed characteristic value,
means for retrieving the identity of the entity based on the changed characteristic value,
means for determining whether the entity is authorized to be sent the changed characteristic value based on one of the one or more distinct update values, and
means for sending the changed characteristic value to the entity based on the determination,
wherein each of the characteristic values is associated with a code, for each characteristic value that the entity is authorized to receive the code associated with the characteristic value is associated with an entity ID and an update value indicating whether the entity is authorized to receive changes relating to the code, retrieving the identity of the entity comprises retrieving the entity ID associated with the code corresponding to characteristic value that has changed, and determining whether the entity is authorized comprises determining the update value that is associated with both the code of the characteristic value that has changed and the entity ID.

7. The system of claim 6, wherein the means for sending the changed characteristic value comprises means for sending the value by email.

8. The method of claim 7 wherein the distinct update value comprise a Boolean value that indicates whether the entity should be sent the modified information.

9. A system for providing product information comprising:
a processor, data and instructions executable by the processor,
the instructions including:
storing a first characteristic value and a second characteristic value associated with respective characteristics of a product,
setting one or more distinct update values indicating whether an entity is authorized to receive changes relating to the first or second characteristic values,
changing at least one of the characteristic values to produce a changed characteristic value,
retrieving the identity of the entity based on the changed characteristic value,
determining whether the entity is authorized to be sent the changed characteristic value based on one of the one or more distinct update values, and
sending the changed characteristic value to the entity based on the determination,
wherein each of the characteristic values is associated with a code, for each characteristic value that the entity is authorized to receive the code associated with the characteristic value is associated with an entity ID and an update value indicating whether the entity is authorized to receive changes relating to the code, retrieving the identity of the entity comprises retrieving the entity ID associated with the code corresponding to characteristic value that has changed, and determining whether the entity is authorized comprises determining the update value that is associated with both the code of the characteristic value that has changed and the entity ID.

10. The system of claim 9 wherein the system comprises a server connected to a network and the entity comprises another server connected to the network.

11. The system of claim 9 wherein the system comprises a server connected to a network, the first and second characteristic values are maintained by a seller, and the entity is a buyer of the product.

12. The system of claim 9 wherein the product is a service.

* * * * *

UNITED STATES PATENT AND TRADEMARK OFFICE
CERTIFICATE OF CORRECTION

PATENT NO. : 8,046,325 B2  
APPLICATION NO. : 12/316867  
DATED : October 25, 2011  
INVENTOR(S) : Brian M. Siegel and Gregory D. Gudorf Page 1 of 2

It is certified that error appears in the above-identified patent and that said Letters Patent is hereby corrected as shown below:

Column 1, line 36, please delete "are";  
Column 2, line 10, "more the", should read --more of the--;  
Column 3, line 8, "PDA's", should read --PDAs--;  
Column 3, line 10, please delete ".";  
Column 3, line 50, "PIIC's", should read --PIICs--:  
Column 3, line 51, "PIIC's", should read --PIICs--;  
Column 3, line 52, please delete ".";  
Column 4, line 25, "PIIC's", should read --PIICs--;  
Column 4, line 26, "PIIC's", should read --PIICs--;  
Column 4, line 38, "PIIC's", should read --PIICs--;  
Column 5, line 11, "then", should read --than--;  
Column 5, line 12, "PIIC's", should read --PIICs--;  
Column 5, line 45, "PIIC's", should read --PIICs--;  
Column 5, line 46, "PIIC's", should read --PIICs--;  
Column 5, line 51, "PIIC's", should read --PIICs--;  
Column 5, line 56, "PIIC's", should read --PIICs--;  
Column 5, line 64, "PIIC's", should read --PIICs--;  
Column 6, line 2, "PIIC's", should read --PIICs--;  
Column 6, line 10, "PIIC's", should read --PIICs--;  
Column 6, line 12, "PIIC's", should read --PIICs--;  
Column 6, line 16, "PIIC's", should read --PIICs--;  
Column 6, line 23, "a", should read --an--;  
Column 8, line 30, "ID's", should read --IDs--;  
Column 9, line 6, "internet", should read --Internet--;  
Column 9, line 23, "PIIC's", should read --PIICs--;  
Column 9, line 27, "PIIC's", should read --PIICs--;  
Column 9, line 28, "PIIC's", should read --PIICs--;  
Column 9, line 43, "product", should read --products--;  
Column 10, line 2, "PIIC's", should read --PIICs--;

Signed and Sealed this  
Fifteenth Day of January, 2013

David J. Kappos  
*Director of the United States Patent and Trademark Office*

CERTIFICATE OF CORRECTION (continued)
U.S. Pat. No. 8,046,325 B2

Column 11, line 10, "to characteristic", should read --to the characteristic--;
Column 11, line 52, "to characteristic", should read --to the characteristic--;
Column 12, line 8, "value", should read --values--;
Column 12, line 38, "to characteristic", should read --to the characteristic--.